United States Patent [19]

Hofstetter et al.

[11] Patent Number: 5,421,715
[45] Date of Patent: Jun. 6, 1995

[54] APPARATUS FOR ENABLING A SIMULTANEOUS PRODUCTION OF PREFORMS

[76] Inventors: Otto Hofstetter, Zurcherstrasse 73; Luis FErnandez, Seeblickstrasse 10, both of 8730 Uznach/Switzerland, Switzerland

[21] Appl. No.: 206,856

[22] Filed: Mar. 7, 1994

Related U.S. Application Data

[63] Continuation of Ser. No. 696,106, May 6, 1991, abandoned, which is a continuation of Ser. No. 350,154, May 11, 1989, abandoned.

[30] Foreign Application Priority Data

May 11, 1988 [DE] Germany .................. 38 16 188.5

[51] Int. Cl.6 .............. B29B 11/06; B29C 45/27; B01F 3/10
[52] U.S. Cl. ..................... 425/547; 425/382.4; 425/572; 138/38; 219/422; 219/424; 366/146; 366/336; 165/181
[58] Field of Search ............. 366/79, 87, 91, 96, 366/149, 146, 336–340; 138/37, 38, DIG. 11; 165/109.1, 179, 181, 182; 425/197–199, 205, 207, 547, 567, 572, 382.4; 264/328.14; 219/422, 424

[56] References Cited

U.S. PATENT DOCUMENTS

| | | | |
|---|---|---|---|
| 2,115,940 | 5/1938 | Burry | 425/547 X |
| 2,253,627 | 8/1941 | Knowles | 425/547 X |
| 2,511,291 | 6/1950 | Mueller | 366/338 X |
| 2,709,128 | 5/1955 | Krause | 165/109.1 X |
| 3,162,703 | 12/1964 | Eyles | 425/547 X |
| 3,286,992 | 11/1966 | Armeniades et al. | 366/339 |
| 3,394,736 | 7/1968 | Pearson | 165/179 X |
| 3,394,924 | 7/1968 | Harder | 366/338 |
| 3,404,869 | 10/1968 | Harder | 366/338 |
| 3,460,809 | 8/1969 | Hauss | 366/338 |
| 3,696,863 | 10/1972 | Kim | 165/181 X |
| 3,817,675 | 6/1974 | Maiocco | 366/83 X |
| 4,049,241 | 9/1977 | Taniguchi | 366/339 |
| 4,249,877 | 2/1981 | Machen | 366/79 X |
| 4,441,823 | 4/1984 | Power | 366/340 X |
| 4,501,498 | 2/1985 | McKelvey | 366/339 X |
| 4,657,496 | 4/1987 | Ozeki et al. | |
| 4,692,030 | 9/1987 | Tauscher et al. | 366/337 |
| 4,800,953 | 1/1989 | Veldhoff | 425/547 X |

FOREIGN PATENT DOCUMENTS

| | | | |
|---|---|---|---|
| 293756 | 12/1988 | | |
| 3026039 | 1/1982 | Germany . | |
| 57-70628 | 5/1982 | Japan | 366/79 |
| 615113 | 1/1980 | Switzerland . | |
| 1340913 | 12/1973 | United Kingdom . | |

OTHER PUBLICATIONS

Denison, Edward E., "A Layman's Guide to Pet Chemistry and Processing", 4th Annual International Conference on Oriented Plastic Containers, Mar. 25, 1981.

*Primary Examiner*—David A. Scherbel
*Assistant Examiner*—Charles Cooley
*Attorney, Agent, or Firm*—Antonelli, Terry, Stout & Kraus

[57] ABSTRACT

Apparatus for the simultaneous production of preforms consisting of polyethylene terephthalate (PET) fed and distributed to a plurality of cavities. In order to reduce the occurrence of acetaldehyde formation in a cavity, for example, a heated distributor block used in the production of preforms of the PET material, the material flowing through a channel is subjected to additional turbulence. To this end, an element, preferably of metal, is installed in the channels, such element being provided with sets of radial spokes which are azimuthally offset in relation to each other in the axial direction. Besides inducing turbulence, such spokes act as homogenizing elements serving to diffuse heat over the cross section of the flowing process material.

8 Claims, 5 Drawing Sheets

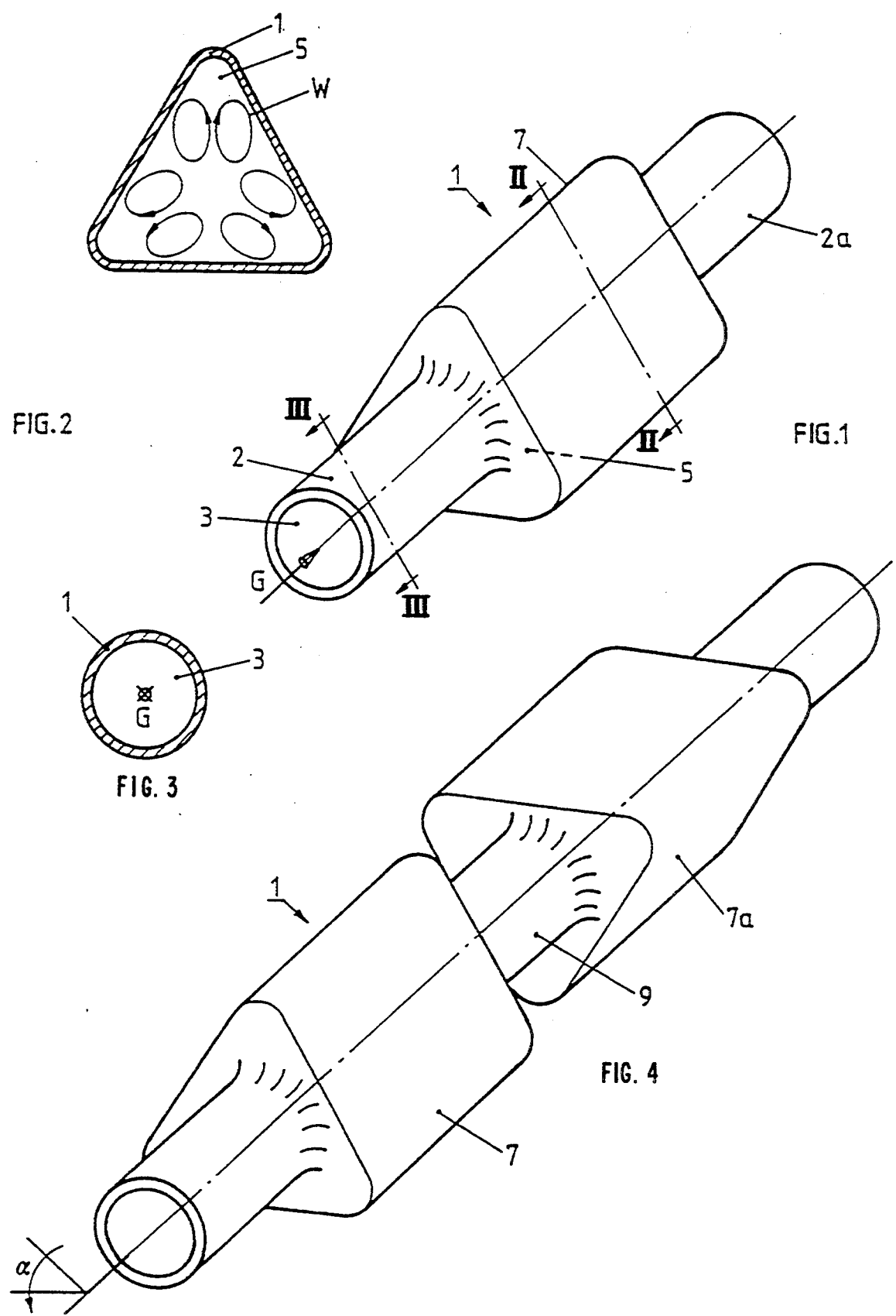

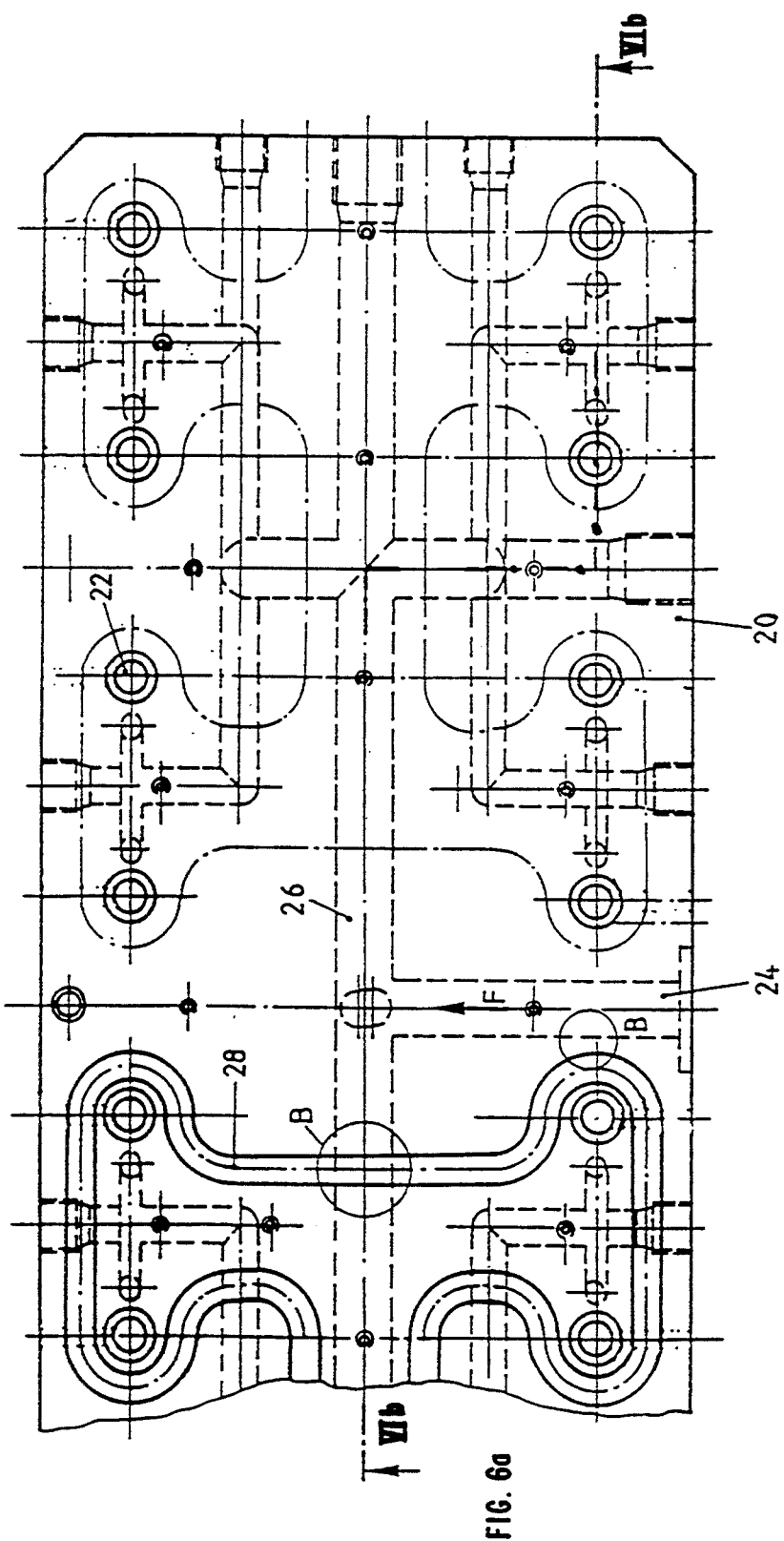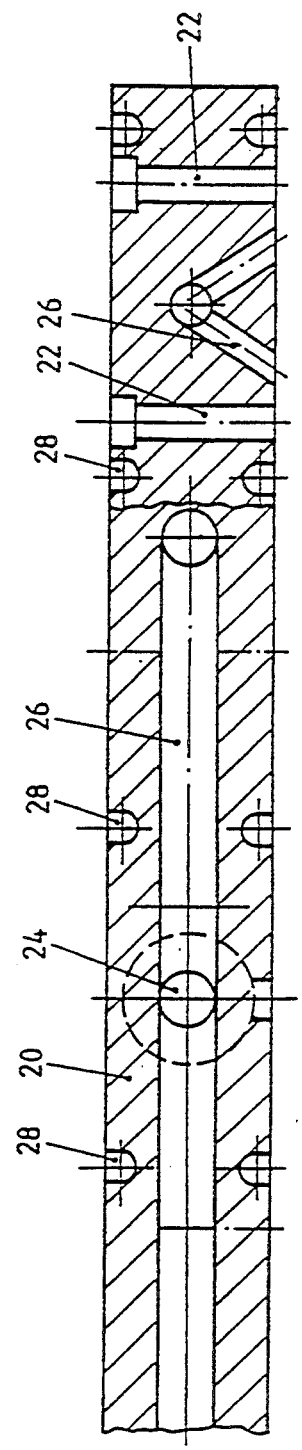
FIG. 6a
FIG. 6b

APPARATUS FOR ENABLING A SIMULTANEOUS PRODUCTION OF PREFORMS

This is a continuation of application Ser. No. 696,106, filed May 6, 1991, now abandoned, which is a continuation of application Ser. No. 350,154, filed May 11, 1989, now abandoned.

BACKGROUND OF THE INVENTION

Field of the Invention

The present invention relates to a process and apparatus suitable for the simultaneous production of preforms consisting of PET (polyethylene terephthalate), a synthetic material, fed and distributed to a plurality of cavities, e.g. a heat distributor block or hot runner mold having the shape of such preformed pieces, a line section, serving to direct the flow of a fluid or viscous product, being an insertable piece as well as a heat distributor block and a set of simultaneously-produced preforms comprising PET material.

II. Description of the Prior Art

The production of preformed pieces of synthetic material and more particularly, preformed pieces of PET material (polyethylene terephthalate) requires that the temperature of the material, which is fed and moulded into the preform shape, lie within a relatively narrow range (see A Layman's Guide to PET Chemistry and Processing; Edward E. Denison, Eastman Chemical Products Inc. presented at the 4th Annual International Conference on Oriented Plastic Containers, Mar. 25, 1981). Should the temperature of the process material be too low, its crystalline content will be too high. Ideally, such material should be processed while in an amorphous state.

Should, on the other hand the temperature of the process material be too high, a condition that causes a reduction in crystalline content, an excess of acetaldehyde results. Acetaldehyde is known to impart a taste to materials of which it forms a part. Acetaldehyde is, even in small amounts, capable of imparting taste to a product carried in blow-moulded preformed objects-e.g. in bottles or other containers.

Thus, on the one hand, the complete avoidance of crystals in the PET material, which is moulded into preforms, is not realizable. The injection, however into the preform moulds of process material having pockets of high crystalline content can lead to opaque streaking in the preforms, due to the fact that PET material, having high crystalline content, and whose crystalline structure-has resulted merely from changing heat conditions, is opaque.

Streak formation in connection with prior art production processes is a problem which, as has already been mentioned, cannot be remedied merely by raising the processing temperature. With respect to prior art mixers, reference is made to: U.S. Pat. Nos. 3,404,869, 2,511,291, 4,692,030, 4,049,241, DE-OS 30 26 039, GB-A-1340913, CH-A-615 113. With respect to the problem treated in the present application, reference is make to U.S. Application No. 56056 and EP-A-0293756 published on 7/12/88.

In prior art production processes involving heated distributor blocks, flow lines of precisely equal length run from a central material feed source to the H-block and then to a plurality of mould cavities. Given prevailing material and process parameters, it is not unusual for the simultaneously-formed preforms to have acetaldehyde proportions of up to 4 to 5 mg/l, whereby the distribution of the acetaldehyde component varies widely across the plurality of simultaneously-formed preforms. Of importance to the serial production of such preforms, however, is the acetaldehyde content of those preforms that exhibit the highest content of that substance. A subsequent sorting of preforms as to their high and low acetaldehyde content is barely possible and quite expensive.

OBJECTS OF THE INVENTION

An object of the present invention is to provide a solution to the above mentioned problem.

A further object of the present invention is that of precisely modifying the relationship between process material and H-block in such a way that the heat-dependent formation of extraneous components in the process material, more particularly, acetaldehyde, is reduced.

SUMMARY OF THE INVENTION

In one embodiment there is provided a process suitable for the simultaneous production of a plurality of preforms from a synthetic material, more particularly, from a PET material, whereby said material is distributed under pressure in a viscous state through a distribution system, more particularly a heated distributor block, to a plurality of cavities having the shape of said preforms, whereby, in order to maintain in the material the same characteristics in all of the cavities, the material is, during the distribution process, and more particularly, in the heated distributor block, blended and, through heat transfer, homogenized with respect to its temperature distribution along one or more line cross sections situated in said distribution system and/or in said feed system.

Through a process of thorough mixing and temperature homogenizing, a general homogenizing action is accomplished with respect to the crystalline portion of the material fed into the moulding cavities, which precludes the above-mentioned formation of opaque streaks.

As has already been mentioned, the second problem attending the simultaneous production of preformed pieces from PET material is that of acetaldehyde formation. During the flow of the viscous material from an extrusion screw to the moulding cavities, heat is transferred to the process material from a heated distributor block. The process material in this case flows through a distribution system inside the block, which is normally heated by electrical means. Because the distribution paths through the heated distributor block are fairly long, attention should be paid to thermal parameters such as the transfer of heat to the material flowing along the walls of the distribution lines of the heated distributor block.

In a second embodiment there is provided a process suitable for the simultaneous production of a plurality of preforms from a synthetic material, more particularly, from a PET material whereby said material is distributed under pressure in a viscous state through a distribution system, more particularly through a heated distributor block, to a plurality of cavities having the shape of the preforms, whereby the time taken by material components to traverse the zone of the line walls, such as that of the heated distributor block line walls, during distribution to the cavities, is reduced by the induction of a radial heat exchange stream in said material flow, in order to lower the heat-dependent formation of components, or, more particularly, of acetaldehyde.

This solution is predicated on the assumption that substantially the same segments of the process material will, during significant portions of their traversal time through the heated distributor block, flow past certain zones of the walls of the distribution lines of such heated distributor block, whereby such portions of the process material will, through friction or heat transfer, most probably be heated to a temperature higher than that of the sections of the process material flowing through the center of such material. Formation of such radially-disposed heat exchange streams, allied with a suitable heat exchange stream flow speed ensures continual replacement by new process material which serves to reduce the time required for the material components in question to pass such heating zone during traversal of the heated distributor block.

A further solution to the above-mentioned problem is suggested by a further embodiment of the present invention which provides a process suitable for the simultaneous production of a plurality of preforms from a synthetic material, more particularly, from a PET material, whereby said material is distributed under pressure in a viscous state to a plurality of cavities having-the shape of said preform, whereby said temperature distribution is homogenized, at least along sections of the distribution system, and more particularly in the heated distributor block, across the cross section of the flow of said material, by the creation of radial heat transfer.

In order to satisfy the above-mentioned object, which is that of homogenizing certain material elements, it is preferred that the process material be thoroughly mixed, in regard to which the blending direction plays no significant role. In this case, thorough mixing of the process material is accomplished by swirling the latter along axial sections.

A solution to the above-mentioned problem, which is that of reducing the formation of harmful components through heat management, is also accomplished through a procedure of thorough mixing abetted by the development of radial heat exchange streams. Thus it is suggested that the process be implemented whereby the accomplishment of the blending procedure serving the satisfaction of the first object permits the development of a radial heat exchange stream, whereby temperature homogenization is also achieved through radial heat transfer.

Although localized blending and creation of the radial heat exchange stream or rather temperature homogenization promotes improved homogeneity and/or reduction in the proportion of heat-dependent components, it is suggested that the process be conducted in such a manner whereby blending and/or radial exchange flow and/or temperature homogenization is effected along substantial longitudinal sections of said feed system, and/or distribution system.

This step can take place in the process system upstream of the heated distributor-block or distribution lines, in the heated distributor block itself or in both locations.

In preferred embodiments the blending and the radial heat exchange stream is accomplished in the feed sections and/or distribution systems, particularly in those of the heated distributor block, through the creation of flow cross-sections that deviate from the circular shape.

The formation of local compartmentalisation in essentially circular line cross-sections of feed lines and/or distribution lines produces flow cross-sections, preferably by of sectoral compartmentalisation, preferably through equal and triple-sector compartmentalisation, and also preferably through temperature homogenization induced by the creation of radial heat transfer.

Downstream of the cross-section deviating from the circular shape, the material flow enters a section having an essentially circular flow cross section.

Flow cross sections deviating from the circular shape and either different or azimuthally offset are staggered in the axial direction.

In view of the above-mentioned processing conditions, it is suggested that a line section be installed for the purpose of more specifically orienting the flow of the fluid or viscous process material.

In accordance with the present invention, a line section suitable for a precise influencing of a flow of a fluid or viscus product includes a primarily tubular outer portion preferably having an essentially circular inner cross section, and one or more essentially radially-oriented flow dividers located at one or more points located at one or more points along the axial extension of the outer portion, with the flow divider including, for the purpose of homogenizing the temperature in the product, a material having good heat conductivity with such material being, for example, a metal.

In an alternate embodiment two or more azimuthally-offset flow dividers are arranged in staggered fashion in the axial direction. In a particularly preferred alternte embodiment three spoke-like flow dividers are arranged in one section and all are preferably offset by the same azimuthal angle.

In view of the consideration that the system used to process the fluid or viscous material is already well established in many locations and that it would therefore not be advantageous to alter this system, it is suggested that the proposed line section simply be installed in existing production lines.

A heated distributor block, with respect to which the objects discussed in relation to the production of preforms of PET material are to be satisfied has an inlet and a distribution system connecting to a plurality of outlets, whereby provided at one or more points along said system are means capable of locally altering the flow cross-section and serving to homogenize, through heat transfer, the temperature of one or more cross-sections of the process system.

In alternate preferred embodiments the heated distributor block is provided with two or more means capable of locally altering the flow cross-section axially staggered in series. The flow altering means comprise one or more flow dividers preferably made of a material having good heat conductivity, e.g. steel. Preferably, the flow divider comprises three azimuthally equally distributed spokes. In another embodiment spoke-like flow dividers are separated along substantial portions of the length of the system and every second flow divider is azimuthally offset from the preceding flow divider.

In yet another alternate embodiment heat-conducting oblique elements made from a metal, e.g. steel, are arranged in zones of a proximity between the heating serpentine of the heated block and the system of distribution lines that is less than the proximity in other parts of said distribution system.

The present invention furthermore suggests, a 32-piece or larger set of simultaneously-produced preforms of PET material, whereby the acetaldehyde content of the preform having the largest acetaldehyde component is at least 30% lower than that of preforms of a similar set produced under the same conditions, without, however, employing the distinguishing methods of the present invention.

BRIEF DESCRIPTION OF DRAWINGS

FIG. 1 a perspective view of a first embodiment example of a proposed line section serving the blending of a traversing process material and the simultaneous formation of a radial heat exchange stream;

FIG. 2 is a schematic cross-sectional view taken along the line II—II in FIG. 1;

FIG. 3 is a schematic cross-sectional view taken along the line III—III in FIG. 1;

FIG. 4 is a perspective view of another embodiment of a line section constructed in accordance with the present invention;

FIG. 6a is a partial plan view of a heated distributor plate of a heated distributor plate of a heated distributor block;

FIG. 6b is a cross-sectional view taken along the line VIb—VIb in FIG. 6a;

FIG. 7 is a schematic view of the structural arrangement of a static mixer installed in a piping system of a heated distributor plate in accordance with FIG. 6a;

DETAILED DESCRIPTION OF THE PREFERRED EMBODIMENTS

Figure 4A:
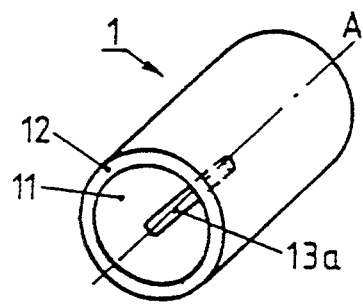
FIGS. 4a–4d are perspective views of structural variations of line sections constructed in accordance with the present invention serving to blend the process material, to produce a radial heat exchange stream, and to induce temperature homogenization in the flowing material stream.
Figure 4B:
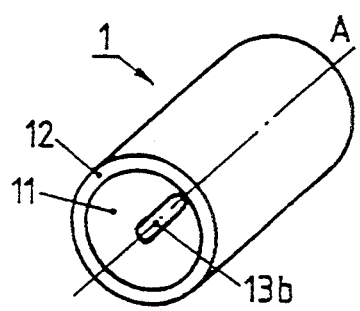

As shown in FIG. 1, a proposed line section 1 a primary tubular inlet 2 of circular-inner cross sectional surface that as can be seen, substantially departs from the circular shape whereby in the example shown, such inner cross sectional surface assumes a triangular shape 5. Schematic sectional representations of a section having circular inner cross section 3 and a section having triangular shape 5, are shown in FIGS. 2 and 3. Where a fluid or viscous material flows through a line having a circular cross section, such as inlet 3, strictly parallel flow is induced should laminar flow predominate, whereas, turbulent flow particularly in the zone of the boundary layer near the wall of the line, is induced in the case of turbulent flow.

In the case of the PET material presently being treated, laminar-mimicking flow is induced during upstream travel, e.g. prior to entering a heated distributor block, whereby the speed of the flow in the wall zone is very slow, but not nil.

Inside a line, the cross section of whose flow substantially departs from the circular shape, as for example, in triangular flow cross section 5, secondary turbulence is also produced.

This phenomenon is schematically illustrated in FIG. 2 and denoted by the letter W.

Provision of the cross sectional shapes shown in FIGS. 2 and 3, produces additional turbulence in the material flowing axis-parallel through section 2 having a circular cross section 3 and apart from primary turbulence of a turbulent flow. The formation of turbulence W effects, together with the supremely simple methods indicated—a blending of products together with a partially radial heat exchange stream. As can be seen to the right of FIG. 2, material flow is, over its integral cross section, excited to varying degrees, in that turbulence is provoked in discretely-distributed turbulence pockets.

Blending is further improved inasmuch as section 2 of circular inner cross section merges as previously mentioned into a section 7 having a triangular cross section and returns to circular inner cross section 2a in which the effect of turbulence W excited in the material stream provokes homogenization of the blend over the integral cross section of such material, flow G (FIGS. 1 and 3).

In accordance with FIG. 3, a second embodiment of the proposed line section comprises two or more sections 7,7a which, being connected in series, are separated preferably by an intermediate section 9 having a circular inner cross section. In this case, each of sections 7,7a has a cross sectional shape that deviates from that of the other. FIG. 4 shows that both sections are, although substantially similar in shape, offset from each other through an azimuthal angle. This arrangement facilitates the excitation of secondary turbulence in accordance with W of FIG. 2 with either an unequal number of turbulence centers or with an equal number of azimuthally offset turbulence centers, which further enhances blending in comparison with the embodiment example shown in FIG. 1.

The proposed line section illustrated in FIGS. 1 to 4 which permits precise modification of the flow of a fluid or viscous material by locally altering the line cross section from a circular shape to one departing from such circular shape, or more particularly to a triangular shape, is, although suited for use as a separately producible component, less compatible in the context of a less expandable, already-constructed distribution system.

Shown in FIGS. 4(a) to 4h provide perspective and cross-sectional views of four examples of line sections, whereby the substantially circular outer contour of inner cross sectional surface 11 is retained, and whereby furthermore proposed line sections constructed after this fashion can also be installed on existing systems. In these cases departure from the circular contour, analogous to triangular cross sectional shape 5 of FIG. 2, is effected by the compartmentalisation of circular cross section 11.

Figure 4C:
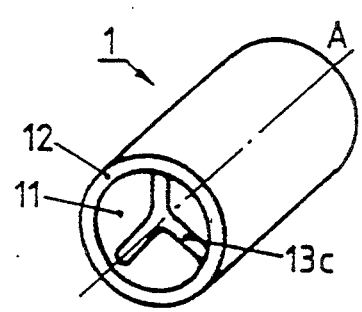
Figure 4E:
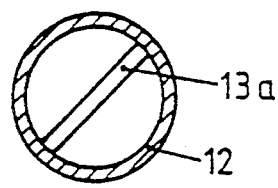
FIG. 4e–4h are transverse cross-sectional views of the line section of FIGS. 4a–4d, respectively.
Figure 4F:
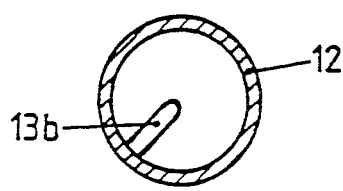

In accordance with FIGS. 4a and 4e, a flow divider 13a, limited in its extension along the axial direction A of the line section, is arranged obliquely and preferably centrally over the cross section 11. In accordance with FIGS. 4b and 4f, cross sectional surface 11 is divided by a flow divider 13b that does not extend across the full cross section 11, in contrast to the embodiment of FIGS. 4a and 4e.

Figure 4G:
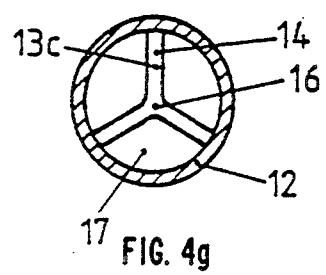
Figure 4D:
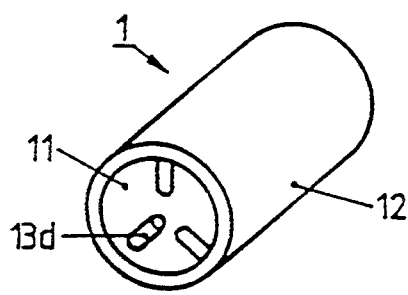

FIGS. 4c and 4g, illustrates a preferred embodiment of a divider 13c, whereby circular sectional surface 11 is divided preferably into three equal segments 12. In this embodiment, and in comparison to that illustrated FIGS. 4d and 4h, the spoke-shaped dividing pins 14 protude up to the center to join together in a zone 16. Analogously to the embodiments shown in FIGS. 1 and 4, a line section 1 substantially constructed in accordance with FIGS. 4a and 4h comprises only one section having cross sectional divisions, preferably however, and analogously to FIG. 4, featuring a plurality of serially-arranged equal or unequal dividing arrangements in accordance with FIGS. 4a to 4h. In the preferred embodiment shown in FIGS. 4c and 4g are two or more units of three spokes each offset azimuthally and serially arranged at predetermined intervals along such line section.

The line sections constructed in accordance with FIGS. 4a–4h can, as already mentioned, be installed without further modification in existing distribution systems. Thus, dividers 13a to 13e can be joined in one piece together with outer jacket 12, or, preferably an insertable piece serving to form such flow divider can be installed separately inside such section.

Figure 4H:
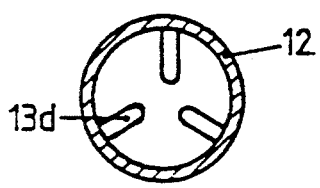
Figure 5:
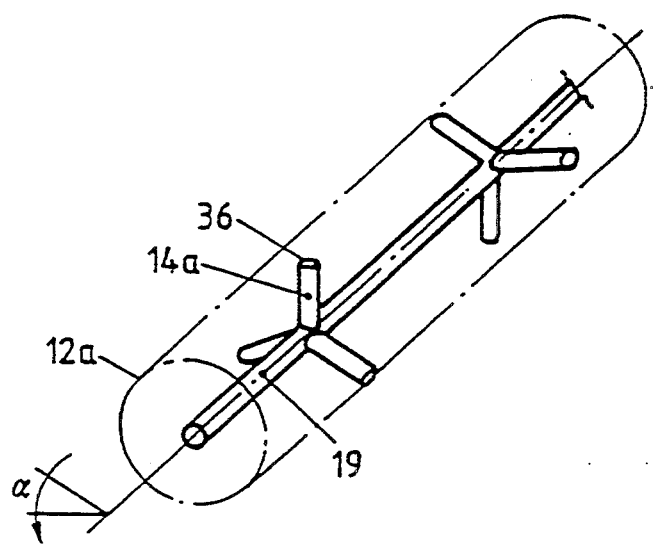
FIG. 5 is a schematic perspective view of a component used in the construction of a proposed line section in accordance with FIG. 4g.

The latter approach reduces production costs, raises flexibility of installation and permits the retrofitting of existing line systems to accord with the design of the proposed line section. An example of such a replacement part, whose installation inside an existing line 12a results in a line section in accordance with FIGS. 4c and 4h is illustrated by FIG. 5. This arrangement features an axially extending bearer 19, whereupon preferably three spokes 14a, axially arranged and evenly separated from each other along one plane, extend outwardly. In this case, it is preferable that two or more such spoke sets be serially arranged in such a way that their spokes are azimuthally displaced with relation to the spokes 14a of the neighboring spoke sets.

In accordance with FIG. 5, the spokes of the two sets shown are azimuthally offset by 60°.

FIGS. 6a and 6b provide an example of a heated distributor plate 20 of a heated distributor block having a design similar to that developed and marketed by the firm Otto Hofstetter AG, 8730 Uznach, Switzerland.

Such heated distributor plates, which, through the attachment to both sides of cover plates becomes a heated distributor block, are employed in the simultaneous production of preformed pieces comprising PET material. Heated distributor plate 20 features a number of exit apertures 22, serving the production of, e.g. thirty-two preforms, which is to say, there are thirty-two such exit apertures 22. Mounted on exit apertures 22 are the moulds (not shown) for the form pieces.

Heated distributor plate 20 features a central inlet 24, from which point distributing channels 26, being all of equal length, extend to exit apertures 22 or lead to the immediate vicinity of the latter, where the connection of distribution channels 26 to the preform mould is accomplished with the aid of bodies attached downstream of heated distributor plate 20, in flow direction F. Molten PET material is forced through inlet 24 and distribution channels 26 to exit apertures 22 and ultimately to the preform moulds.

In this process, the PET material proceeds in a heated state, whereby the provision of meandering heating serpentines 28 located on both surfaces of heated distributor plate 20, prevents cooling off of the process material during traversal of heated distributor plate 20.

As mentioned at the outset, the heating of the PET material is of prime importance to the success of its processing. Should the advancing PET material have localized regions of insufficient heat, such areas develop high crystalline content. If, on the other hand, the material has been, if only locally, excessively heated, acetaldehyde begins to form in such areas. Should, however, such pockets of high crystalline content caused by deficient heating be extruded coaxially through exit aperture, 22 into a preform mould, opaque streaks are likely to develop in the finished preform.

Figure 7:
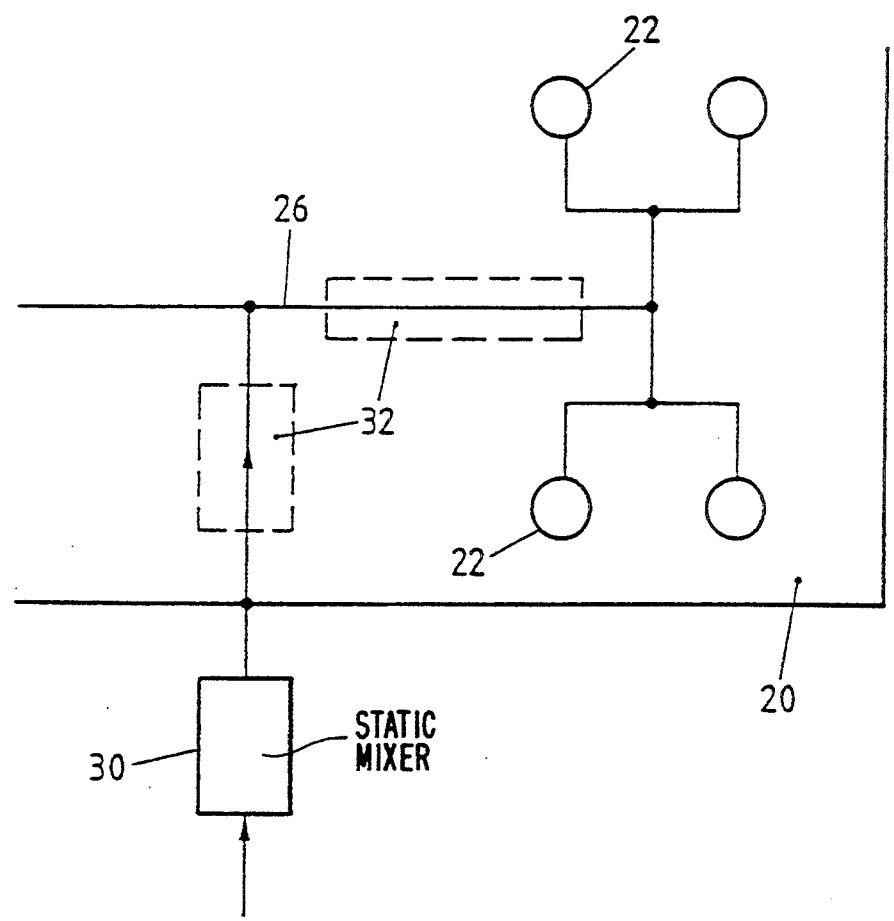

In order to substantially-prevent the extrusion at exit apertures 22 of localized zones of high crystalline content occurring in an otherwise amorphous mass, a static mixer provided in accordance with FIG. 7, in which, predicated on the illustration of FIG. 6, is shown the schematic distribution of channels 26 to exit apertures 22 located in heated distributor plate 20. The syatic mixer 30 can be installed, upstream of heated distributor plate 20, and/or, as schematically indicated by broken lines at 32, along distribution channels 26 located inside heated distributor plate 20.

The upstream-installation of such static mixer 30 permits the use of a prior art static mixer such as that supplied by Sulzer Co.

It is preferable however, that blending be accomplished not only upstream of heated distributor plate 20, but, as indicated by the broken line 32, along distribution channels 26, to which role such prior art static mixers are, e.g. due to size considerations and to those respecting the resistance such mixers could present to material flow, not at all or at least only slightly suited.

As has already been mentioned, excessive PET material temperatures engender pockets of high acetaldehyde formation. Regarding the production of preforms in particular, which are subsequently blown into bottles, e.g. for mineral water, the reduction of the acetaldehyde component is of the utmost importance, since even minimal quantities of this substance can impair the quality of the mineral water contained in such bottles.

Heated distributor plate 20 actually constitutes, as shown in. FIGS. 6a and 6b, a heating surface corresponding to the surfaces of distribution channels 26, through which the hot PET material is caused to flow. Should regions of the material stream brush, during traversal of substantial segments of channels 26, the walls lining such channels 26, such material regions will, due either to friction or to prolonged heat exchange along the travel path, be heated to a temperature higher than that of regions of material flowing through the centre. Increased amounts of acetaldehyde will form in the former regions. Even in the presence of repeated localized turbulence along channels 26 caused by forks and bends, such regions will not be homogenized to the extent of causing diffusion of the acetaldeyde content throughout the material stream, but rather will remain largely concentrated in pockets, and as a result of which will exit from one or more exit apertures 22 to one of the designated preform moulds. This arrangement causes significant increase in acetaldehyde content with respect to all of the preform moulds and ultimately to all of the preforms simultaneously produced thereon. Should even one preform exhibit increased acetaldehyde content, which does not always have to apply to the same preform produced at exit aperture 22, such a method clearly cannot be used with respect to critical products such as mineral water bottles. This problem can be solved, in particular, along substantial sections of distribution channels 26, in that the advancing PET material is caused to develop a radial heat exchange stream, the result of which being that, along straight sections, material regions will flow rapidly past the zone of the channel walls, since such regions are continuously moved into the centre of the stream by the radial heat exchange stream.

Such radial exchange streams can be created by the use of line sections as described in connection with FIGS. 1 to 4. As shown in FIG. 2, the desired radial heat exchange stream is achieved with the aid of turbulence W. Such radial heat exchange streams, which serve primarily the reduction of traversal times of material pockets past the wall zones of distribution channels 26, permits the blending and homogenization of the process material with respect to its crystalline content. Although line sections as shown in FIGS. 1 to 4 are highly suited to the role of static mixer shown in FIG. 7 upstream of heated distributor plate 20, their installation along distributing channels 26 of heated distributor plate 20 require at once structural modifications to existing heated distributor plates and a relatively large production cost related to the laying out of distribution channels 26 in the normally steel-constructed heated distributor plate 20. Such line sections are on the other hand eminently suited, as FIGS. 4a–4h and FIG. 5 show, to the production of radial heat exchange streams and to the blending of process material and promote another, possibly decisive factor, which will be dealt with presently in greater detail.

Figures 8, 8A:
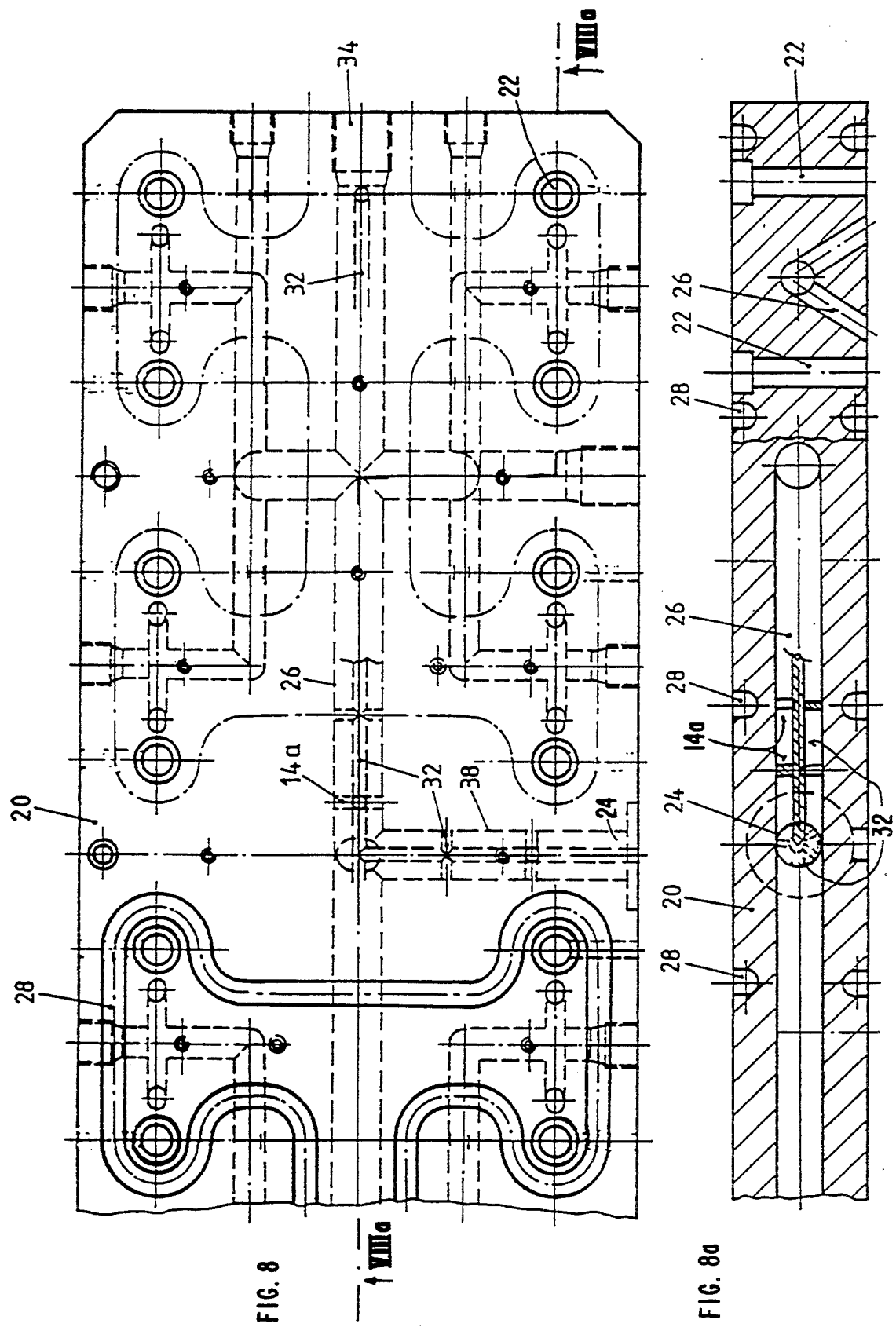
FIG. 8 is a plan view of a heated distributor plate for blending a flowable product, creating radial heat exchange streams, and achieving temperature homogenization at predetermined flow cross-sections of the material.
FIG. 8a is a cross-sectional view taken along the line VIIIa—VIIIa of FIG. 8.

FIG. 8 shows a preferred embodiment of a proposed heated distributor block together with heated distributor plate 20. Clearly, components as depicted in FIG. 5 are installed preferably along substantial sections of distribution channels 26, as illustrated in FIG. 8 and indicated by reference number 32. Such components, preferably in possession of azimuthally-staggered spokes 14a, in accordance with FIG. 5, are held in position inside channels 26 by for example stoppers 34.

Such components 32, comprise, in respect of the presently-considered application, material possessing a high heat conductivity —preferably steel, and have a shape analogous to that shown in FIGS. 4c and 4g, with axial bearer 19 as shown in FIG. 5. As FIGS. 6a,6b, and 8a show, heating serpentines 28 run closer to certain sections of distribution channels 26, than to other sections. Such sections of greater proximity to such serpentines are circled in FIG. 6a and bear the letter B.

It must be ensured that after a suitable operating period, the temperature distribution in heated distributor plate 20 remain stationary, however on no account homogenous, since the temperature of heating serpentines 28, which constitutes the heat source, are obliged to drop when in the vicinity of heated distributor plates 20, in order to satisfy prevalent surface requirements of the heated distributor plate. Thus, especially in zones such as those marked by the letter B in FIG. 6a, the channel walls of channel 26 are hotter than zones having a greater separation from heating serpentines 28. It follows from this arrangement that process material zones flowing in the zones of the channel walls due to turbulence and induced axial exchange flow are subjected to relatively higher temperatures and thus contain pockets of high acetaldehyde concentration. In order to accomplish in such zones a homogenization of the material stream with respect to the added heat quantities or, rather, to the temperature of such material, components made preferably of such material as steel, are arranged, in accordance with FIG. 8, in such a way that their presence in channel zones contiguous with the heating serpentine serves to direct heat from the channel walls to the inside of the material stream. Precise fitting of frontal surfaces 36 shown in FIG. 5 to the inner walls of the channel achieve, through direct contact, an effective transfer of heat from the channel wall to the interior of the advancing PET material stream. Such an arrangement produces significant reduction of the acetaldehyde component in the preform of the simultaneously produce preform set, wherein is found the highest concentration of acetaldehyde.

The following tables give the acetaldehyde values of thirty-two simultaneously-produced preforms without the installation of elements serving to induce exchange flow and temperature homogenization, more particularly without the installation of line section 38 of FIG. 8 of the element shown in FIG. 5. Also shown in the following tables are acetaldehyde values of a thirty-two-piece preform set simultaneously produced under the same conditions, but with the inclusion in section 38 of a component as shown in FIG. 5.

It is clear that the installation in channel section 38 of the proposed component results in a 30% reduction in the acetaldehyde content of the preform containing the greatest amount of acetaldehyde.

TABLE 1

| 2.61 | 2.73 | 2.96 | 2.72 |
|---|---|---|---|
| 2.30 | — | 3.12 | 2.93 |
| 2.81 | 2.89 | 3.51 | 2.78 |
| — | 4.04 | 4.11 | 2.56 |
| 3.05 | 3.86 | 4.39* | 3.14 |
| 2.84 | 3.04 | 3.50 | 2.93 |
| 2.88 | 3.02 | 3.15 | 2.76 |
| 2.67 | 2.84 | 2.95 | 2.82 | in μg/l* = Max. value

TABLE 2

| 1.94 | 2.15 | 2.08 | 1.95 |
|---|---|---|---|
| 2.05 | 2.18 | 2.26 | 1.98 |
| 1.87 | 2.35 | 2.18 | 2.07 |
| 2.17 | 2.96 | 2.77 | 1.93 |
| 2.13 | 3.09* | 2.85 | 1.86 |
| 1.96 | 2.38 | 2.34 | 2.08 |
| 2.05 | 2.23 | 2.19 | 1.87 |
| 1.95 | 2.10 | 2.10 | 1.98 | in μg/l* = Max. value

In absolute terms, processes comprising extruder screws placed upstream of heating blocks facilitate reduction of acetaldehyde content. Relatively speaking, however, values produced with the component illustrated in FIG. 5 are different from values without such component.

We claim:

1. A heated distributor block for enabling a production of synthetic material preforms including polyethylene terephthalate preforms, the heated distributor block comprising an inlet for said synthetic material, a distribution system connected to a plurality of outlets for movement of said synthetic material through said heated distributor block to said outlets, at least one rod member provided at least at one location of said distribution system for locally altering at least one flow cross-section of the synthetic material moving therethrough and homogenizing, through a heat transfer, a temperature in the at least one flow cross-section of said synthetic material, and a heating serpentine within said heated distributor block, said distribution system includes a system of distribution lines having portions thereof which are relatively closer to said heating serpentine than other portions thereof, and wherein said at least one rod member is formed of metal and is arranged in a portion of said distribution lines which is relatively closer to said heating serpentine than said other portions thereof.

2. A heated distributor block according to claim 1, wherein at least two rod members are provided in said distribution lines and are staggered in series along a longitudinal axis of one of said distribution lines.

3. A heated distributor block according to claim 1, wherein at least two rod members are arranged in series in one of said distribution lines and are azimuthally-offset with respect to each other.

4. A heated distributor block according to claim 1, wherein a plurality of rod members are provided in said distribution lines and are formed of a thermally conductive material.

5. A heated distributor block according to claim 4, wherein said rod members are disposed as spokes in an azimuthally-equal distribution around a centrally disposed connecting means for connecting said rod members to each other.

6. A heated distributor block according to claim 4, wherein at least three azimuthally equally distributed rod members are connected to a centrally disposed connecting means.

7. A heated distributor block according to claim 1, wherein at least two rod members are disposed at spaced positions along a longitudinal axis of one of said distribution lines, and wherein said at least two rod members are respectively offset with respect to each other.

8. A heated distributor block according to claim 1, wherein a plurality of rod members are provided in said distribution lines, said rod members are formed as a plurality of spokes spaced from each other along an axial length of one of said distribution lines, and wherein said rod members are azimuthally offset from each other.

* * * * *